C. O. Stevens,
Horseshoe.
Nº 81,307. Patented Aug. 18, 1868.
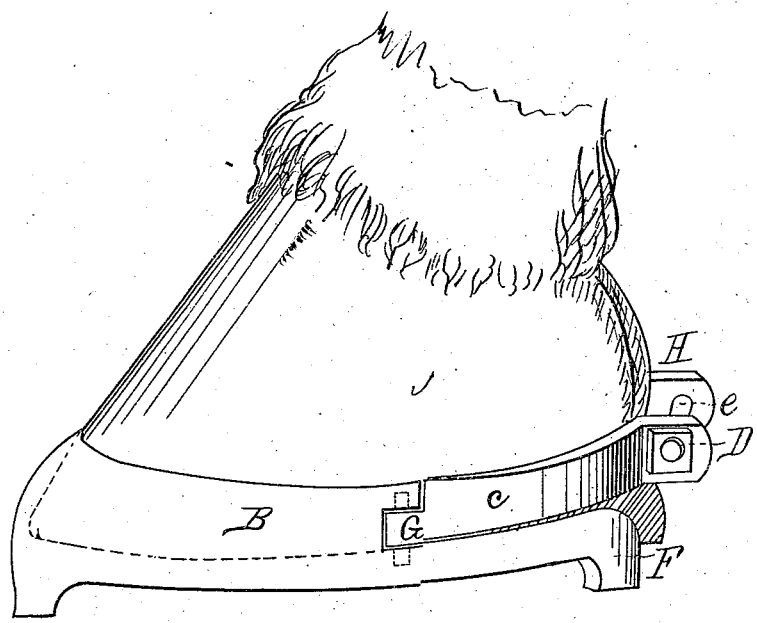
Witnesses:
Philip J. Dorn Jr
W. C. Wood
Chas. S. Whitman
for
Inventor

United States Patent Office.

CHARLES O. STEVENS, OF AUBURN, MAINE.

Letters Patent No. 81,307, dated August 18, 1868.

IMPROVEMENT IN HORSE-SHOES.

*The Schedule referred to in these Letters Patent and making part of the same.*

TO ALL WHOM IT MAY CONCERN:

Be it known that I, CHARLES O. STEVENS, of the town of Auburn, in the county of Androscoggin, and State of Maine, have invented a new and useful Improvement in Horse-Shoes; and I do hereby declare that the following is a full and exact description thereof, reference being had to the accompanying drawings, and to the letters of reference marked thereon, making a part of this specification.

My invention relates to an improvement in horse-shoes, which may be secured to the hoof without the use of nails, and without requiring the services of a smith.

The invention consists in constructing a shoe with a cap, to fit over and about the hoof.

The said shoe is jointed at each of its sides, and clamped or fastened to the hoof by means of a screw, arranged as hereinafter described.

The following description will enable others to understand my invention, reference being had to the accompanying drawing.

The front part of the shoe, B, is fitted to the contour of the forward part of the hoof, encasing and protecting the same, and extending upward about the third of the height of the hoof.

The rear piece, C, is also formed to fit the contour of the hoof A, and is joined, by means of a hinge or pivot, to the forward part of the shoe, B. The rear piece, C, may be moved laterally about the pivot G as a centre, and may thus be made to occupy any desired position.

The rear part of the shoe is thus separated into two parts at the pivot G, to wit, the rear piece, C, and the bottom piece, F.

A right-handed female screw is cut through the extremity of the rear piece, C, and a left-handed female screw through the extremity of the rear piece, H, and corresponding screws are cut in the ends of the cross-bar e, so that when the said cross-bar e is turned on its axis in one direction, the rear pieces, C and H, are made to recede from each other or open, and when turned in an opposite direction, the said rear pieces close together, and may thus be firmly clamped about the rear part of the hoof.

It is submitted that this construction gives a shoe superior in essential points to any heretofore used.

Having thus described my invention, I claim as new, and desire to secure by Letters Patent—

The top piece, B, and rear piece, C, joined by the pivot G, secured to the hoof by means of the screw cross-bar e, substantially as herein set forth and for the purposes herein mentioned.

CHARLES O. STEVENS.

Witnesses:
R. L. ROSS, Jr.,
CHAS. S. WHITMAN.